United States Patent [19]

Harper et al.

[11] 4,136,947
[45] Jan. 30, 1979

[54] MICROFILM PROJECTION PRINTER

[76] Inventors: James F. Harper; James F. Harper, Jr.; Christian P. Harper, all of 13063 Ventura Blvd., Studio City, Calif. 91604

[21] Appl. No.: 798,359

[22] Filed: May 19, 1977

[51] Int. Cl.² .................. G03B 27/48; G03B 27/52
[52] U.S. Cl. ................................. 355/50; 355/30
[58] Field of Search .............. 355/18, 30, 35, 50, 355/32; 352/89, 228

[56] References Cited

U.S. PATENT DOCUMENTS

| 1,361,012 | 12/1920 | Capstaff | 355/35 |
|---|---|---|---|
| 2,207,103 | 7/1940 | O'Grady | 355/32 |
| 2,479,553 | 3/1949 | Boecking | 352/228 |
| 2,672,074 | 3/1954 | Gunby | 355/50 |
| 3,148,585 | 9/1964 | Armstrong et al. | 355/18 X |
| 3,264,933 | 8/1966 | Frank | 355/50 |
| 3,614,223 | 10/1971 | Ott | 355/30 |
| 3,682,540 | 8/1972 | Oxberry et al. | 355/18 |

FOREIGN PATENT DOCUMENTS

| 217298 | 9/1961 | Austria | 355/18 |
|---|---|---|---|
| 886914 | 7/1943 | France | 355/18 |
| 174622 | 6/1923 | United Kingdom | 355/50 |

Primary Examiner—Donald A. Griffin
Attorney, Agent, or Firm—Fulwider, Patton, Rieber, Lee & Utecht

[57] ABSTRACT

A continuous printer for microfilm especially adapted to receive unperforated 35mm film carrying microfilm images and project such images onto other film such as 16mm or 8mm film, the printing being done continuously as opposed to a step-by-step process.

3 Claims, 11 Drawing Figures

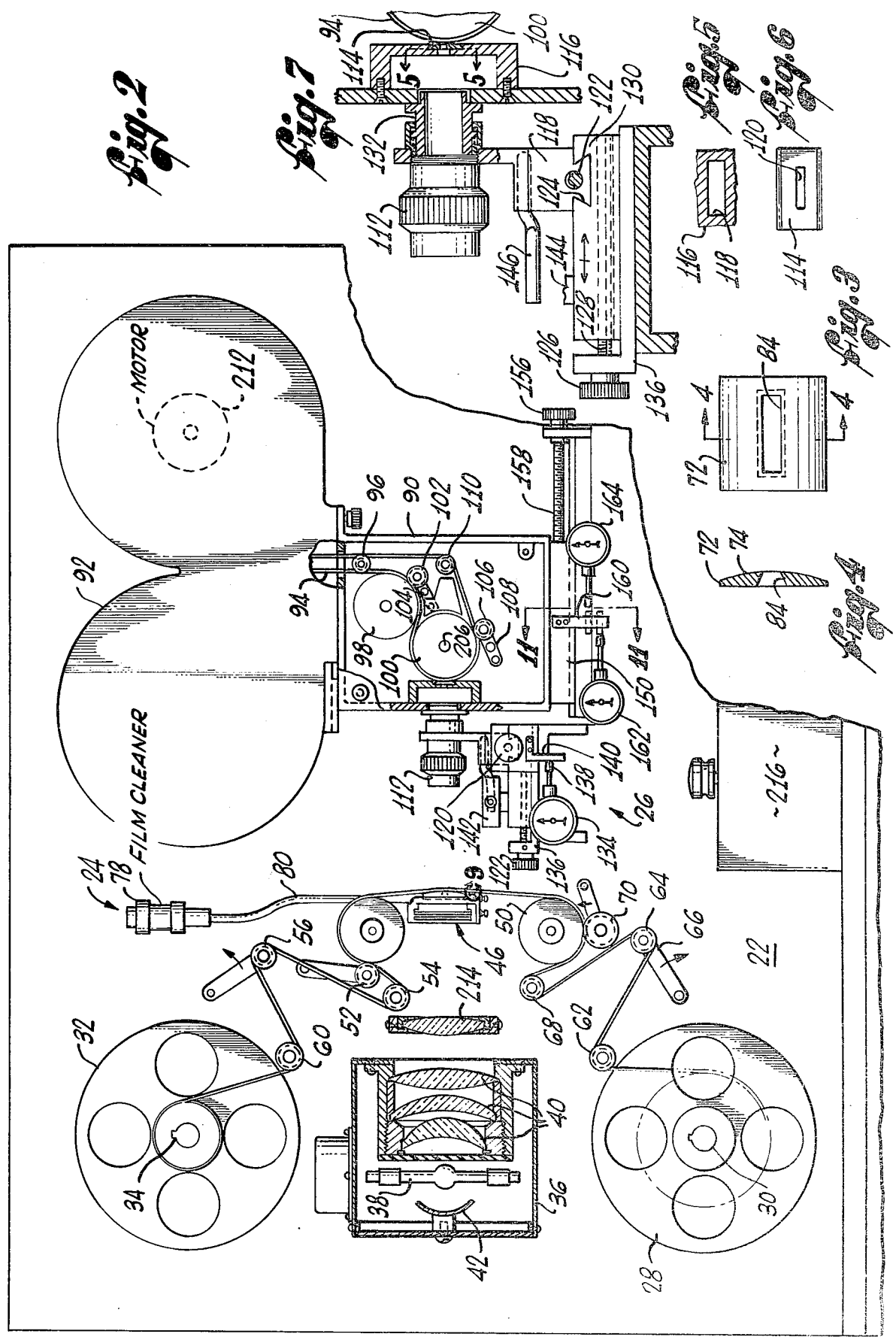

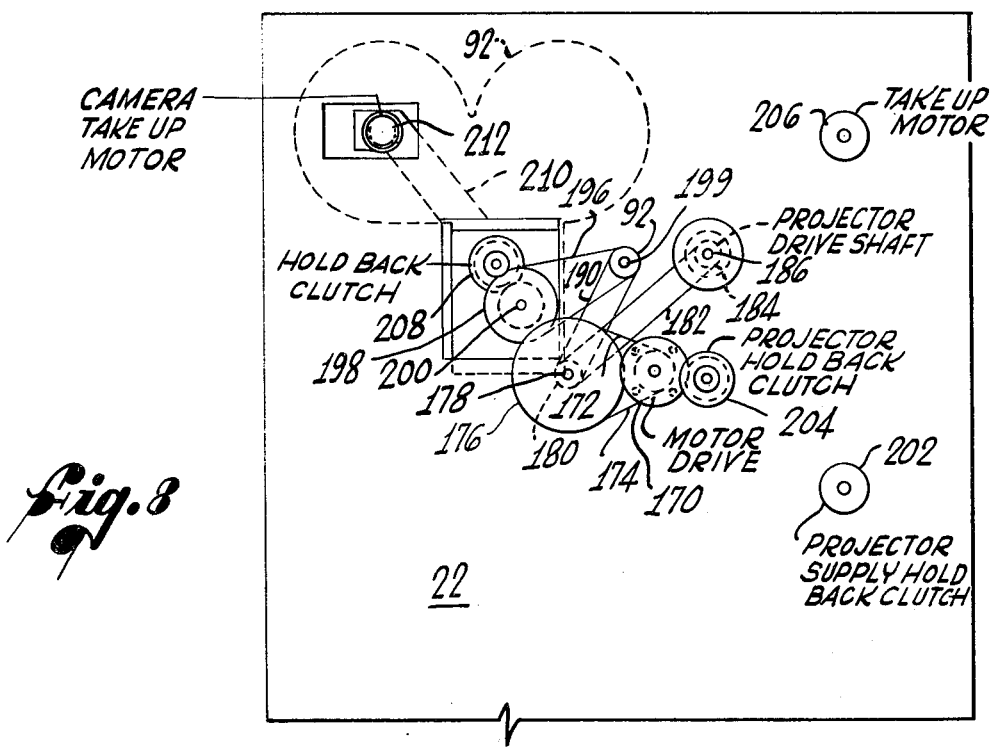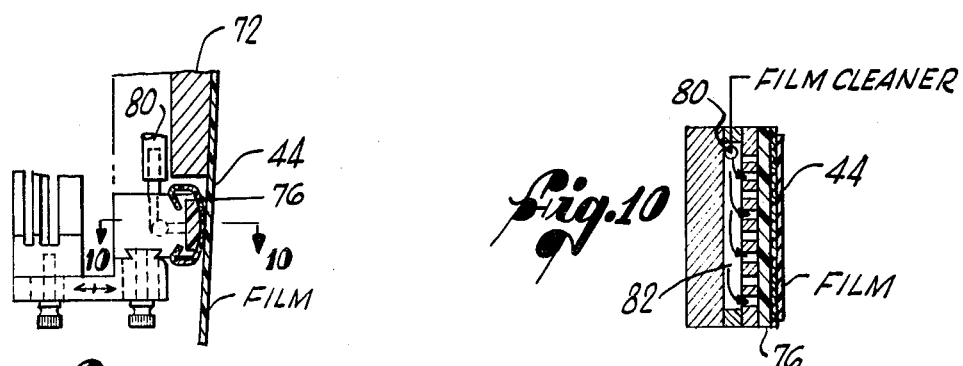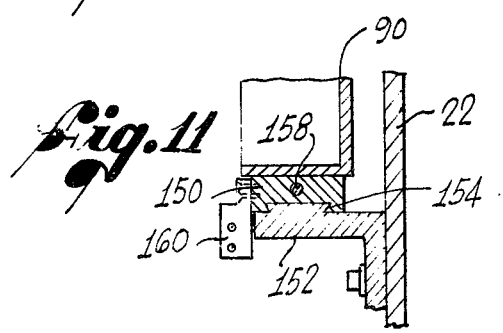

MICROFILM PROJECTION PRINTER

BACKGROUND

When microfilm was first developed as a means of copying records, the film commonly used for this purpose was unperforated 35mm film. The 35mm film was readily available and it was quite simple to secure the unperforated film so that the largest possible image could be secured. The quality of the lenses available was such that larger images were desirable.

Since then the optical systems and the film emulsions have both been improved and it is now customary to use 16mm film for the making of microfilm copies and the use of 8mm film is being considered. Except in special cases, 35mm film is not presently being used but instead smaller films are now used. It is obviously much more convenient to have all of the microfilm records on film of one size and, hence, many organizations are now converting their 35mm microfilms to 16mm or even 8mm microfilm records.

To effect this conversion, the 35mm microfilm records must be printed onto the smaller size film.

Conventional motion picture printers rely upon the perforations in the film to register the image, to insure its proper advancement, and to hold it immovable during the exposure. Since microfilm is not perforated, it is not possible to use the pins of the conventional motion picture film printer to register and advance the film and, hence, the usual step printing operation is not suitable for microfilm.

Furthermore, since the material that is conventionally recorded on microfilm is usually printing or other material having correspondingly fine lines, it is very important that the image formed on the camera film be very sharp and that there be no movement of the image with respect to the film at any time.

SUMMARY OF INVENTION

The present invention comprises a projector for larger microfilm, a camera for smaller microfilm, and means to drive the film in the camera and the film in the projector at constant speeds and at a constantly maintained ratio with respect to each other. The projector has a suitable light source and film gate while the camera has a suitable lens and means for adjusting the proper position of the lens and of the film and related accessory equipment. The projector is provided with a so-called lubricated gate and the camera has a rotating drum that carries the film across the camera gate.

DESCRIPTION OF FIGURES

FIG. 2 is a front elevational view of the printer to a somewhat larger scale than FIG. 1;

FIG. 3 is an elevational view of the film gate of the projector;

FIG. 4 is a sectional view through the gate taken on the line 4—4 of FIG. 4;

FIG. 5 is taken on line 5—5 of FIG. 7 showing the aperture between the lens and the aperture plate of the camera;

FIG. 6 is an elevational view of the aperture plate of the camera;

FIG. 7 is an elevational view partially in section of the lens mounting for the camera showing the adjusting means for the camera and the film gate;

FIG. 8 is an elevational view of the means for driving the camera and projector in synchronism;

FIG. 9 is an elevational view partially in section showing the means for moistening the film as it goes across the projector gate;

FIG. 10 is a sectional view taken on the line 10—10 of FIG. 9 and showing the method of moistening the film; and FIG. 11 is a view taken on the line 11—11 of FIG. 2 showing the mounting of the camera means and the means for precisely locating the camera.

DESCRIPTION OF PREFERRED FORM

Figure 1:
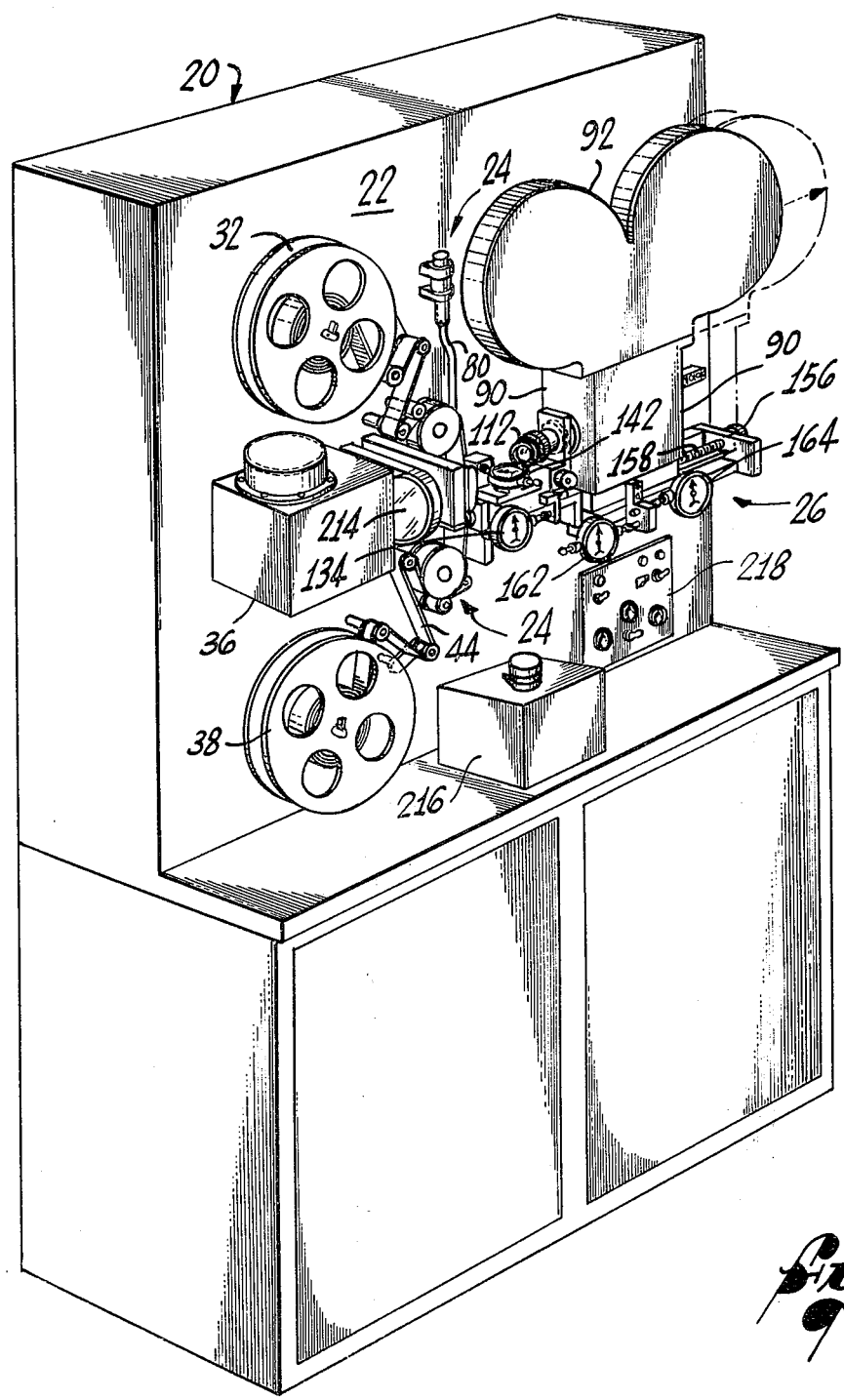
FIG. 1 is a front perspective view of the printer.

As seen in FIG. 1, the printer designated generally by the numeral 20 includes a back plate 22 that supports a projector 24 and a camera 26. The back plate 22 holds the projector 24 in a fixed position while the camera 26 is mounted on the back plate 22 for adjustment toward and away from the projector 26 as hereinafter described. Drive means, hereinafter described, makes use of a single motor to drive the projector 24 and the camera 26 so that while the camera and projector may drive their respective films at a differing speeds, the films always move at the same proportionate speed with respect to each other.

DESCRIPTION OF PROJECTOR

As seen in FIGS. 1 and 2, the projector 24 includes a supply reel 28 mounted on a shaft 30 that projects through and is supported by the back plate 22. A takeup reel 32 is generally similarly supported on a takeup shaft 34 and a lamp house 36 mounted between the supply reel 30 and the takeup reel 34 contains a high intensity lamp 38 and suitable optical means including lenses 40 and a reflector 42 to project a beam of light toward the camera 26. Film 44 from the supply reel 28 passes across the projector gate 46 to be wound on the takeup reel 32.

As has previously been indicated, it is extremely important that the film 44 move at a constant speed with respect to the corresponding film in the camera 26 and, hence, the driving means for the projector is located as close to the film gate 46 as is practical. Furthermore, since the film 44 does not have perforations, the drive must be by a roller over which the film passes, making sufficient contact with the roller so that there is no slipping between the film and the roller. Additionally, to provide a constant tension, the film passes over another roller of generally similar characteristics which provides a constant resistance to the movement of the film.

As seen in FIG. 2, a drive roller 48 is located above the gate 46, between the gate and the takeup reel 32; and a similar roller, known as a holdback roller, 50 is located below the gate 46 between the latter and the supply reel 28. A roller 52 holds the film 44 in contact with a major portion of the circumference of the drive roller 48 so that good driving contact is insured between the drive roller and the film. From the roller 52 the film passes over a fixed roller 54 and then over a tensioning roller 56 mounted or a resiliently pivoted arm 58 that acts to maintain a constant tension in the film at all times. From the tensioning roller 56 the film passes over the fixed roller 60 and then onto the takeup reel 32.

Between the supply reel 28 and the holdback roller 50 the film 44 has first passed over a fixed roller 62 and then over a tensioning roller 64 mounted on a resiliently pivoted arm 66, all corresponding to the similarly named and located rollers and arm of the takeup reel 32.

A fixed roller 68 guides the film 44 from the tensioning roller 64 to the holdback roller 50 and a movable roller 70 insures that the film stays in contact with the holdback roller.

The gate 46 includes an aperture plate 72, shown in FIGS. 3 and 4, having a curved front surface 74 across which the film 44 travels between the holdback roller 50 and the drive roller 48. The aperture plate 72 is located slightly forwardly of a tangent connecting the surfaces of the drive roller 48 and the holdback roller 50 so that the film is held against the front surface 74 of the aperture plate at all times, the curved surface insuring that the film stays in contact with the plate at all times in its passage over the plate.

To insure the maximum cleanliness and also to provide a slight amount of lubrication for the passage of the film across the aperture plate 72, a pad 76 is mounted at the lower end of the aperture plate 72 as shown in FIG. 9, and a liquid film cleaner and lubricant, such as 1,1,1-Trichloroethane is delivered from a supply reservoir 78 by means of a tube 80 to a chamber 82 behind the pad 76.

As seen in FIGS. 3 and 4, the aperture plate 72 has an aperture 84 extending slightly beyond the edges of the film 44, through which aperture the light from the lamp 38 passes. Since the exposure is made through this aperture 84, it is important that the light from the lamp 38 be uniform across the aperture and, furthermore, that the aperture have a uniform width measured in the direction of film travel across the entire width of the film.

CAMERA

Like the projector 24, the camera 26 is mounted on the back panel 20 but unlike the projector, the camera is mounted for movement along the optical axis of the projector toward and away from the latter. Considering first the details of the camera 26 without particular consideration of its mounting, the camera includes a housing 90 adapted to receive a film magazine 92 containing supply and takeup reels (not shown). In the illustrated embodiment, the film 94 comes from a supply reel in the magazine 92, the supply reel being located nearer the projector 24 and, after passing through the housing 90, the then exposed film is wound on the takeup reel within the magazine 92 farther from the projector.

Again, the film 94 is not perforated and, hence, all driving of the film must be by the friction between the film and the rollers that engage it. As best seen in FIG. 2, the film 94, after entering the housing 90, passes over a spacing roller 96, over a relatively large diameter holdback roller 98, and then over a drive roller 100. As in the case of the holdback roller 50 of the projector 24, the purpose of the holdback roller 98 in the camera 26 is to insure that the drive roller 100 works against a constant load and the film 94 is subjected to a constant tension as it passes over the drive roller. Holding roller 102 on pivoted arm 104 and holding roller 106 on pivoted arm 108 insure that the film 94 is properly guided around the holdback roller 98 and the drive roller 100. Roller 110 guides the film from roller 106 to the opposite side of spacing roller 96. In its passage through the housing 90, the film 94 is thus positively driven over a simple path at a speed determined by the drive roller 100.

As indicated in FIG. 7, the axis of the drive roller 100 is perpendicular to and located on the optical axis of the camera and projector. A lens 112 is mounted on the front of the housing 90, the optical axis of the lens generally being aligned with the optical axis of the projector 24. The images from the film 44 are thus focused by the lens 112 and projected upon the surface of the film 94 that is carried by the drive roller 100. An aperture plate 114 is locate immediately in front of film 94 and is removably held in position in the wall of a compartment 116 located between the lens 112 and the drive roller 100. As indicated in FIG. 7, the aperture plate 114 has beveled edges that fit into corresponding slots in the inner wall of compartment 116 to form a dovetail slide so that the aperture plate may be removed as desired. Between the aperture plate 114 and the lens 112, the inner wall of compartment 116 has an aperture 118 somewhat larger than the aperture 120 in the plate 114 so that apertures of different size and shape may be used as needed. As is customary, the aperture plate 114 has an aperture 120 of precise size and shape, the aperture being formed with knife edges to prevent unwanted reflections. The compartment 116 in addition to supporting the aperture plate 114 acts to prevent stray light from striking the film 94.

The lens 112 is mounted to be, normally, aligned with the optical axis of the projector 24. The lens 112 is mounted on a cross slide 118 that may be moved transversely across the optical axis of the projector by thumb wheel 120 driving a threaded rod 122 that moves the cross slide 118 in ways such as dovetail ways 124.

In turn, the cross slide 118 may be moved back and forth parallel to the optical axis of the projector 24 by means of a thumb wheel 126 that rotates a threaded rod 128 to move the cross slide 118 and its supporting block 130 parallel to the optical axis so that the lens 112 may be focused. A tube 132 fits into the rear end of the lens 112 for telescopic engagement of the rear end, and this support is provided to permit focusing of the lens 112. The tube 132 also prevents any stray light from entering the chamber 90.

To indicate the axial position and, hence, the focus of lens 112, the position of block 130, as adjusted by the thumb wheel 126 and shaft 128, is indicated by a gauge 134 that is mounted on the supporting bed 136 that holds the thumb wheel shaft and movably supports the block 130. The operating stem 138 of the gauge 134 bears against a projection 140 carried by the movable block 130 so that the axial position of the lens 112 with respect to the housing 90 can be quickly and accurately read.

As previously mentioned, the slide 118 is movable transversely across the optical axis by rotation of the thumb wheel 120 and corresponding rotation of the threaded shaft 122. In a corresponding manner, the transverse position of the lens 112 may be read on a gauge 142 mounted by means 144 on the block 130 and operated by an arm 146 projecting from the slide 118.

It will be appreciated that it is not always desirable to have the precisely same reduction on all prints made from a 35mm master microfilm. Even when the images are being transferred from 35mm microfilm to 16mm microfilm the individual customer may wish a slightly different reduction from that of other customers. Consequently, to accommodate these differences in size, the camera 26 is mounted so that it may be moved along the optical axis of the projector to achieve the desired image size and the position of the lens 112 thereafter adjusted by means of the knob 126 to provide the necessary precise focus.

To provide the necessary movement for the housing 90 the latter is mounted on a base 150 that cooperates with a supporting angle 152 mounted on the back plate 22. The base 150 and supporting angle 152 are connected by a dovetail slide 154, as shown in FIG. 11, and a thumb wheel 156 turns a threaded shaft 158 to move the foundataion back and forth along the angle support 150.

To indicate the precise location of the housing 90, a gauge operator 160 is attached to the base member 150 for movement therewith and a pair of gauges 162 and 164 are mounted on the supporting angle 152 so that as the operator 160 is moved back and forth along the supporting angle 152, one or the other of the gauges 162 or 164 will indicate the position of the housing. It will be realized that gauges such as gauges 162 and 164 can measure only a certain predetermined distance and since the housing 90 will often be moved beyond the range of a single gauge the gauges 162 and 164 are positioned so that one of them measures a certain distance to the left of a predetermined point and the other measures a certain distance to the right of that point and, in this manner, the two gauges can cover a distance substantially double that which either of them alone could measure.

DRIVE SYSTEM

The importance of synchronism between the film moving through the projector 24 and the camera 26 has previously been emphasized and to achieve this, a particular type of drive system is used. In each case, it is the drive roller that is the element whose speed must be precisely controlled. Thus, the drive roller 48 of the projector 24 must turn in synchronism with the drive roller 100 of the camera 26 even though they do not rotate at the same speed.

To accomplish this drive synchronism, a single motor is used to drive both the projector drive roller 48 and the camera drive roller 100. As seen in FIG. 8, an electric motor 170 is mounted on the rear of the back panel 22 and drives a pulley 172 that is connected by belt 174 to a larger diameter pulley 176. Pulley 176 is supported on shaft 178 that in turn is mounted on the back plate 22. Pulley 176 carries a pair of smaller pulleys 180 on it, one of which carries a belt 182 that drives a projector pulley 184 that is mounted on shaft 186 which extends through the back panel 22 to carry the projector drive pulley 48. This, it will be realized, results in the projector drive pulley being turned at a speed that is a constant ratio with the speed of the drive motor 170.

A second pulley 180 on the shaft 178 carries a belt 190 that drives a pulley 192 supported on a shaft 194 rotatably supported by the back plate 22 and fixed in position thereon. From pulley 192, a belt 196 extends to pulley 198 mounted on shaft 200 which, on its other end, carries the camera drive pulley 100. It will be appreciated that like the projector drive pulley 48 previously described, the camera drive pulley 100 will likewise rotate at a speed proportional to that of the motor 170. Furthermore, since both the projector drive pulley 48 and the camera drive pulley 100 are driven by the same motor, the two drive pulleys will have a speed proportionate to each other at all times.

It has been found that superior results are obtained by using flat belts instead of using V-belts or toothed belts since these latter types seem to set up vibrations in the power transmission system so that the instantaneous speed of the projector drive pulley is not always proportional to the instantaneous speed of the camera pulley. It will be appreciated that unless the camera and projector films move in absolute synchronism, there will be a tendency for the image formed on the camera film to move with respect to the film and thus "smear," making the resulting picture somewhat blurred. This is obviously an undesirable feature.

While the driving of the projector drive pulley 48 and the camera drive pulley 100 are of great importance, it is also important that provision be made to maintain the necessary tension on the films at all times as well as to provide for their being wound on their respective takeup reels. Considering first the projector 24, the supply reel 28 mounted on shaft 30 is prevented from rotating at an unnecessarily high rate of speed, and thus loosening the film on the reel, by means of friction means mounted on the opposite end of the shaft 30 from the reel 28. The friction means takes the form of what is known in the trade as a holdback clutch 202, and a similar holdback clutch 204 is mounted on the shaft supporting the holdback pulley 50. The takeup reel 32 is provided with a motor 206 that drives shaft 34, supporting the takeup reel, it being understood that in accordance with conventional practice there would generally be some slippage between the shaft of the takeup motor 206 and the shaft 34 supporting the takeup reel 32.

In the camera 26, the holdback roller 98 is provided with a holdback clutch 208, generally similar to those previously mentioned, in each case the function of the holdback clutch being to provide a frictional restraint to the rotation of the particular shaft or roller so that rotation is restrained and a constant tension is provided in the film.

The magazine 92 of the camera 26 is intended to be installed and removed from the housing 90 and, hence, a support 210 must be provided to support a takeup motor 212 that engages the takeup reel of the magazine 92. Such magazines conventionally have a holdback means incorporated in the magazine to prevent the supply reel from rotating too rapidly.

GENERAL OPERATION

When it is desired to make a copy of a film, reducing the size of the images from 35mm film to 16mm film, the larger film is placed upon the supply reel 28 and then threaded over the rollers and pulleys as previously described, particular attention being paid to the fact that the film 44 passes over the holdback roller 50, across the pressure plate 74, and over the drive roller 48 on its way to the takeup reel 32.

The unexposed 16mm film 94 in the camera 26 is threaded over the holdback roller 98 and over the drive roller 100 and then back to the magazine 92 as previously explained. The cover of the housing 90 is then closed and sufficient film is run through the camera so that previously unexposed film is then available for receiving the images from the projector 24.

It is assumed that the housing 90 is precisely located in the desired position and the lens 112 is properly focused. With these preparations out of the way, the bulb 38 is then energized and the drive motor 170 is started so that the film 94 is properly exposed to the various images. It should be noted that the bulb 38 is generally of an extremely high intensity type and preferably one that is rich in actinic light, such as a mercury arc lamp. The very high intensity of the light makes it desirable to make provision for a band pass filter 214 and also to make provision to receive neutral density filters such as may be inserted in the film gate support 46. The heat developed by the bulb 38 requires a flow of cooling air over the bulb which may be provided by a blower (not shown). The projector take-up motor 206 is controlled by control 216 in FIG. 1. The blower and other motors are controlled by a control panel 218.

After the full length of film in the camera 26 has been exposed, the magazine 92 is removed and sent to the laboratory for processing while another magazine may be substituted and the copying proceeds.

From the foregoing, it will be seen that there has been provided a copier especially designed and adapted to do reduction copying of microfilms. While there has been shown a device fully capable of achieving the objects and securing the advantages heretofore set forth, it will be apparent that modifications may be made therein and consequently the patent is not to be restricted to the particular form or arrangement of parts herein described and shown except as limited by the following claims.

We claim:

1. A microfilm projection printer for reduction printing which includes:

a projector having means for storing a first film;

means for projecting light through said first film along an optical axis;

a first driving means in said projector for moving said first film continuously at a substantially constant predetermined rate uniform throughout the path of movement of said first film, said first driving means including a driving roller immediately adjacent said optical axis and around which said first film travels after said first film's passage across said optical axis and a hold back roller immediately adjacent optical axis and around which said first film travels before said films passage across said optical axis whereby said first film is subjected to a substantially constant tension and moves at a substantially constant speed in its passage across said optical axis;

a camera having means for storing a second film;

lens means for forming an image of said first film on said second film;

a second driving means in said camera for moving said second film continuously at a substantially constant predetermined rate uniform throughout the path of movement of said second film;

and motor means including an electric motor connected by a first belt to said first driving means and by a second belt to said second driving means.

2. A microfilm projection printer for reduction printing which includes:

a projector having means for storing a first film;

means for projecting light through said first film along an optical axis;

a first driving means in said projector for moving said film continuously at a substantially constant predetermined rate uniform throughout the path of movement of said first film;

a camera having means for storing a second film;

lens means for forming an image of said first film on said second film;

a second driving means in said camera for moving said second film continuously at a substantially constant predetermined rate uniform throughout the path of movement of said second film, said second driving means including a driving roller whose axis of rotation is perpendicular to and intersects with said optical axis, said second film passing around said driving roller and being driven thereby and a holdback roller adjacent said driving roller and around which said second film travels prior to its travel across said driving roller whereby the second film is subjected to a substantially constant tension and moves at a substantially constant speed in its passage around said optical axis;

and motor means including an electric motor connected by a first belt to said first driving means and by a second belt to said second driving means.

3. A microfilm projection printer for reduction printing which includes:

a projector having means for storing a first film;

means for projecting light through said first film along an optical axis;

a first driving means in said projector for moving said film at a substantially constant predetermined rate uniform throughout the path of movement of said first film, said first driving means including a projector driving roller immediately adjacent said optical axis and around which said first film travels after said film's passage across said optical axis, and a projector holdback roller immediately adjacent said optical axis and around which said first film travels before said film's passage across said optical axis whereby said first film is subjected to a substantially constant tension and moves at a substantially constant speed in its passage across said optical axis;

a camera having means for storing a second film;

lens means for forming an image of said first film on said second film;

a second driving means in said camera for moving said second film continuously at a substantially constant predetermined rate uniform throughout the path of movement of said second film, said second driving means including a camera driving roller whose axis of rotation is perpendicular to and intersects with said optical axis, said second film passing around said driving roller and being driven thereby, and a camera holdback roller adjacent said camera driving roller and around which said second film travels prior to its travel around said driving roller whereby said second film is subjected to a substantially constant tension and is moved at a substantially constant speed in its passage across said optical axis;

and motor means including an electric motor connected by a first belt to said first driving means and by a second belt to said second driving means.

* * * * *

UNITED STATES PATENT AND TRADEMARK OFFICE
CERTIFICATE OF CORRECTION

PATENT NO. : 4,136,947
DATED : January 30, 1979
INVENTOR(S) : Harper et al

It is certified that error appears in the above—identified patent and that said Letters Patent are hereby corrected as shown below:

Column 2  Line #19

..."projector 26"  should be--projector 24--.

Signed and Sealed this

Twenty-fifth Day of September 1979

[SEAL]

Attest:

LUTRELLE F. PARKER
Attesting Officer   Acting Commissioner of Patents and Trademarks